(12) United States Patent
Tani et al.

(10) Patent No.: US 10,351,088 B2
(45) Date of Patent: Jul. 16, 2019

(54) KNEE BOLSTER

(71) Applicant: Kyoraku Co., Ltd., Kyoto (JP)

(72) Inventors: Naoto Tani, Aichi (JP); Takafumi Funato, Kanagawa (JP)

(73) Assignee: Kyoraku Co., Ltd., Kyoto (JP)

( * ) Notice: Subject to any disclaimer, the term of this patent is extended or adjusted under 35 U.S.C. 154(b) by 50 days.

(21) Appl. No.: 15/557,286

(22) PCT Filed: Mar. 10, 2016

(86) PCT No.: PCT/JP2016/057665
§ 371 (c)(1),
(2) Date: Sep. 11, 2017

(87) PCT Pub. No.: WO2016/143874
PCT Pub. Date: Sep. 15, 2016

(65) Prior Publication Data
US 2018/0056913 A1    Mar. 1, 2018

(30) Foreign Application Priority Data

Mar. 11, 2015   (JP) ................. 2015-048773

(51) Int. Cl.
*B60R 21/045*    (2006.01)
*B60R 21/00*    (2006.01)

(52) U.S. Cl.
CPC .... *B60R 21/045* (2013.01); *B60R 2021/0051* (2013.01)

(58) Field of Classification Search
CPC .... B60R 2021/0051; B60R 2021/0414; B60R 2021/0421; B60R 2021/0428; B60R 21/04; B60R 21/045
See application file for complete search history.

(56) References Cited

U.S. PATENT DOCUMENTS

| 4,662,649 A | * | 5/1987 | Ikeda | ............... B60R 21/045 180/90 |
| 4,752,084 A | * | 6/1988 | Kawasaki | ......... B60R 21/045 280/752 |

(Continued)

FOREIGN PATENT DOCUMENTS

| JP | 05213129 A | * | 8/1993 |
| JP | 07323797 A | * | 12/1995 |

(Continued)

OTHER PUBLICATIONS

International Search Report from Japan Patent Office dated May 31, 2016, in connection with corresponding PCT/JP2016/057665 application. (2 pages).

*Primary Examiner* — Laura Freedman
(74) *Attorney, Agent, or Firm* — Maier & Maier, PLLC

(57) ABSTRACT

Provided is a knee bolster that is formed of a blow-molded body and can be easily and stably mounted on a mounting target. The blow-molded body has a back surface having a mounting protrusion to be inserted into a mounting hole formed in a mounting target. The blow-molded body includes a lower lock disposed so as to protrude from the back surface to under the mounting target and configured to suppress upward movement of the blow-molded body relative to the mounting target.

9 Claims, 12 Drawing Sheets

(56) References Cited

U.S. PATENT DOCUMENTS

| | | | | |
|---|---|---|---|---|
| 5,273,314 A * | 12/1993 | Sakakibara | ............ | B60R 21/045 188/377 |
| 5,318,822 A * | 6/1994 | Rhodes | ................. | B60K 37/00 180/90 |
| 5,865,468 A * | 2/1999 | Hur | ....................... | B60R 21/045 188/377 |
| 6,170,872 B1 * | 1/2001 | Bair | ..................... | B60R 21/045 280/748 |
| 6,837,518 B2 * | 1/2005 | Mullan | ................. | B60R 21/045 188/377 |
| 6,866,294 B2 * | 3/2005 | Horsch | ................. | B60R 21/045 280/752 |
| 7,143,876 B2 * | 12/2006 | Tamada | .................. | B60R 19/18 188/371 |
| 7,699,367 B2 * | 4/2010 | Evans | ..................... | B60R 19/18 293/102 |
| 8,251,399 B2 * | 8/2012 | Babian | ................. | B60R 21/045 280/752 |
| 8,439,400 B2 * | 5/2013 | Suzuki | ................ | B60R 21/0428 280/751 |
| 8,443,950 B2 * | 5/2013 | Tamada | .................. | B60R 19/18 188/371 |
| 9,522,646 B2 * | 12/2016 | Tamada | ................ | B60R 21/045 |
| 9,643,553 B2 * | 5/2017 | Tamada | .................. | B60R 19/18 |
| 2014/0048367 A1 | 2/2014 | Tani et al. | | |
| 2018/0339671 A1* | 11/2018 | Funato | .................... | B60R 21/04 |

FOREIGN PATENT DOCUMENTS

| | | | | |
|---|---|---|---|---|
| JP | 08164811 A | * | 6/1996 | |
| JP | 2001146120 A | * | 5/2001 | |
| JP | 2002331897 A | * | 11/2002 | |
| JP | 2005263151 A | * | 9/2005 | |
| JP | 2007090954 A | * | 4/2007 | |
| JP | 2012076570 A | * | 4/2012 | |
| JP | 2012219863 A | * | 11/2012 | |
| JP | 2012/241859 A | | 12/2012 | |
| WO | 2012/137892 A1 | | 10/2012 | |

* cited by examiner

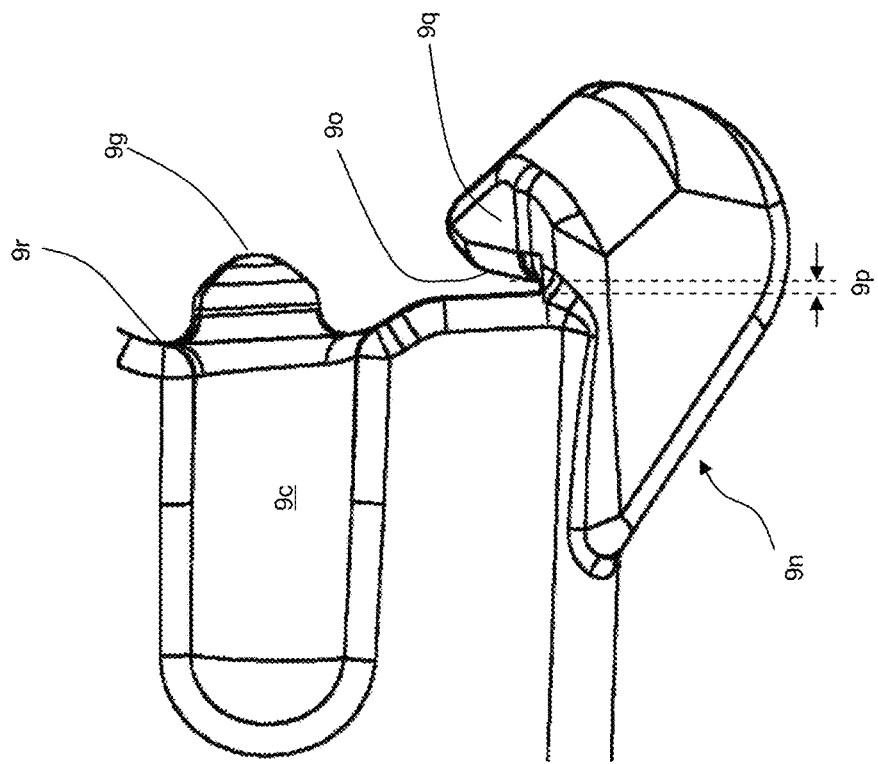
FIG. 4B PARTIAL ENLARGED VIEW
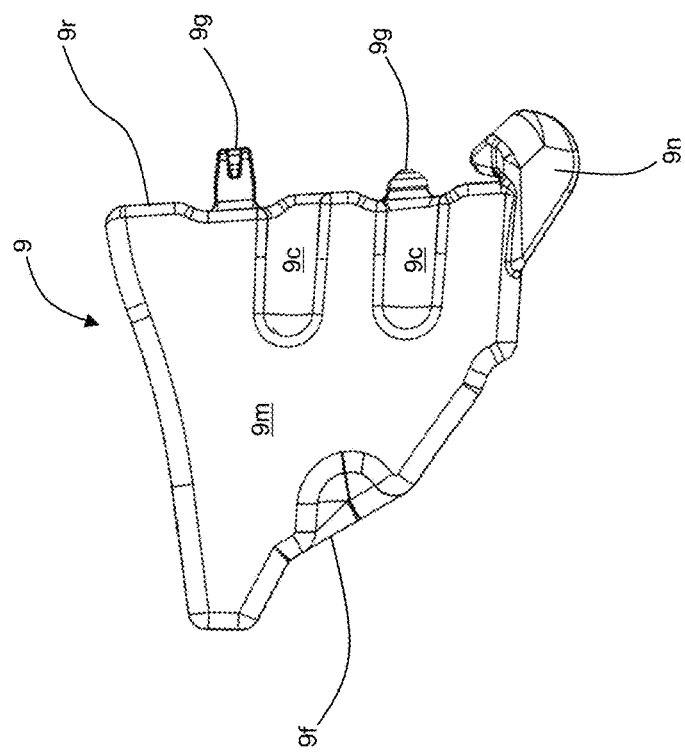
FIG. 4A RIGHT SIDE VIEW

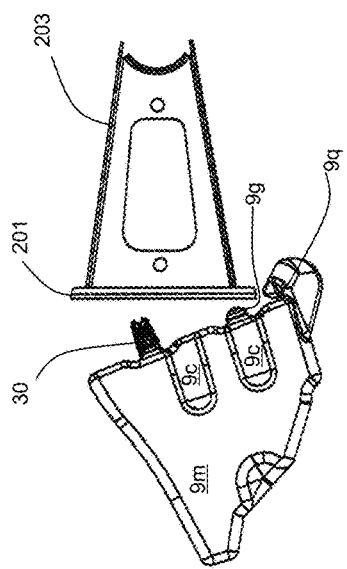
FIG. 6A BEFORE MOUNTING
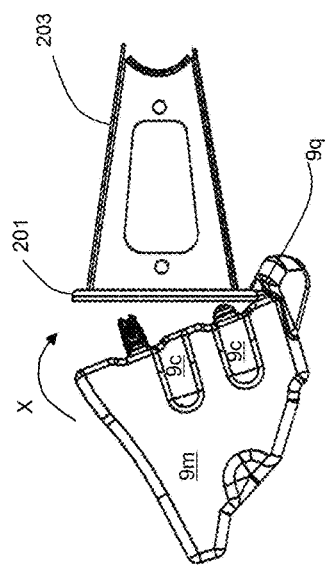
FIG. 6B WHILE MOUNTING
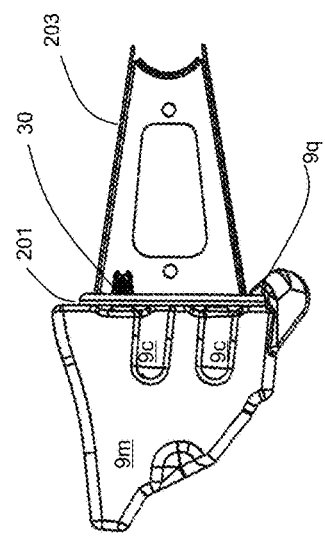
FIG. 6C AFTER MOUNTING

SECOND EMBODIMENT

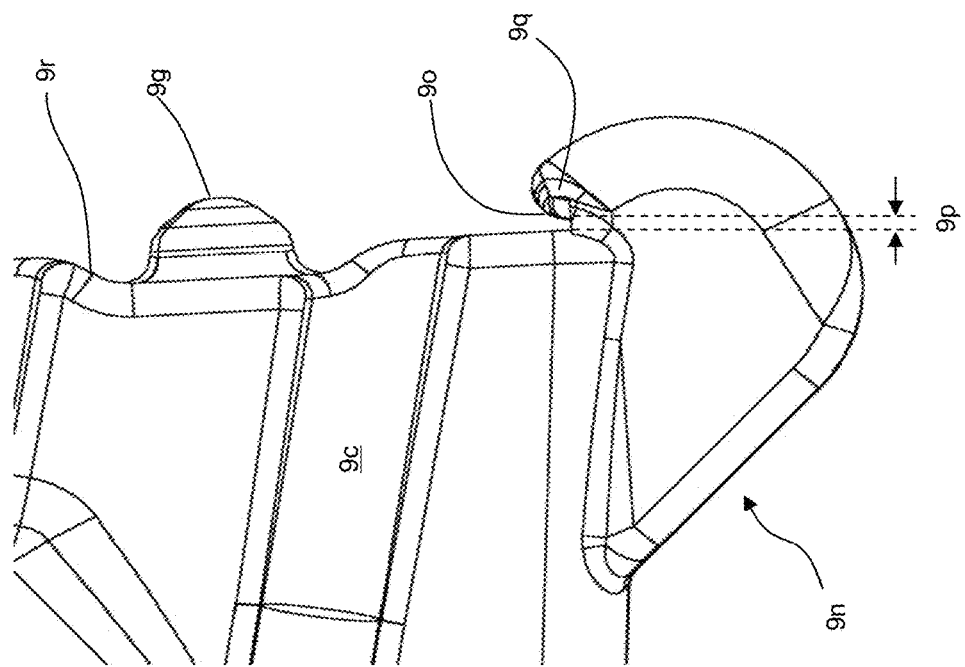
FIG. 9B PARTIAL ENLARGED VIEW
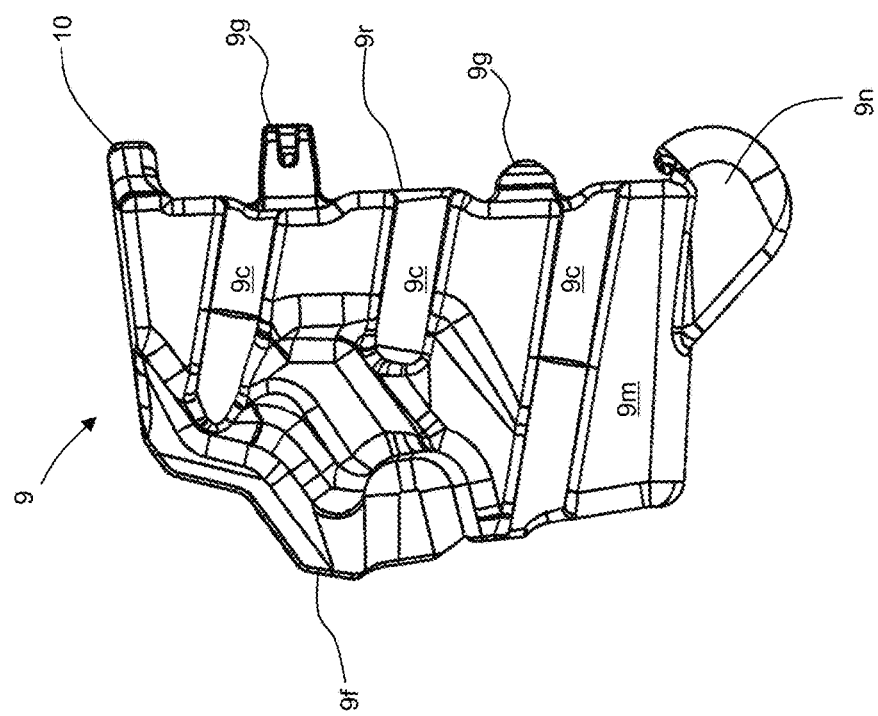
FIG. 9A RIGHT SIDE VIEW

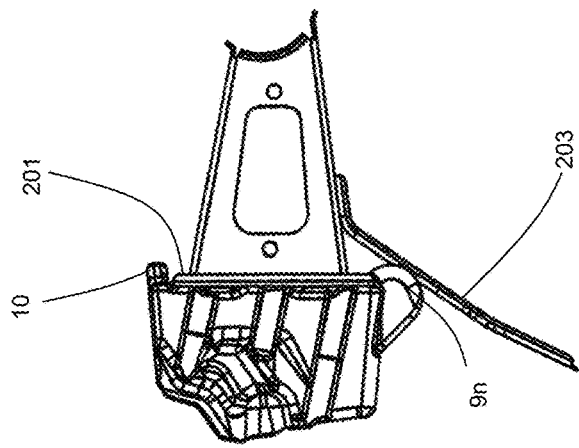
FIG. 11C AFTER MOUNTING
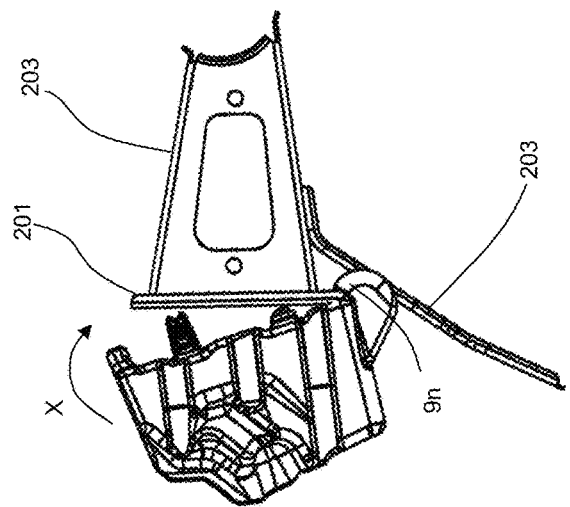
FIG. 11B WHILE MOUNTING
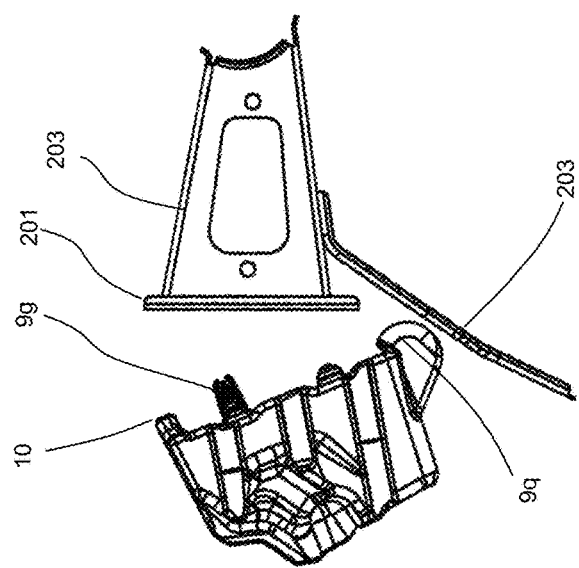
FIG. 11A BEFORE MOUNTING

KNEE BOLSTER

TECHNICAL FIELD

The present invention relates to a knee bolster formed of a blow-molded body.

BACKGROUND ART

A knee bolster is disposed ahead of a knee of a passenger sitting on a front seat of a vehicle and has a function of protecting the knee of the passenger by plastically deforming itself when the vehicle hits something head-on. Patent Literature 1 discloses a knee bolster formed of a blow-molded body. This blow-molded body is mounted on a mounting target by inserting mounting claws disposed on the back surface into mounting holes formed in the mounting target.

CITATION LIST

Patent Literature

Patent Literature 1: WO2010/137892

SUMMARY OF INVENTION

Technical Problem

Patent Literature 1 discloses various mounting claws. Mounting these mounting claws requires positioning the mounting claws with respect to the mounting holes. Since mounting targets are disposed ahead of the knees of a passenger sitting on a seat, the working space is narrow, and it takes time and effort to position knee bolsters precisely. Also, once the mounting claws come out of the mounting holes when a load is inputted to any knee bolster, the knee bolster may be demounted from the mounting target.

In view of the foregoing, an object of the present invention is to provide a knee bolster that is formed of a blow-molded body and can be easily and stably mounted on a mounting target.

Solution to Problem

The present invention provides a knee bolster formed of a blow-molded body. The blow-molded body has a back surface having a mounting protrusion to be inserted into a mounting hole formed in a mounting target. The blow-molded body includes a lower lock disposed so as to protrude from the back surface to under the mounting target and configured to suppress upward movement of the blow-molded body relative to the mounting target.

The knee bolster of the present invention has the back surface having the mounting protrusion to be inserted into the mounting hole formed in the mounting target and includes the lower lock disposed so as to protrude from the back surface to under the mounting target and configured to suppress upward movement of the blow-molded body relative to the mounting target. According to this configuration, in mounting the knee bolster, the knee bolster is positioned by hooking the lower lock from under the mounting target. Thus, the mounting protrusions can be easily inserted into the mounting holes. Also, when a load is applied to the knee bolster, the upward movement of the knee bolster is suppressed in the region where the lower lock and the lower side of the mounting target hit each other.

Various embodiments of the present invention are described below as examples. The embodiments below can be combined with each other.

Preferably, the lower lock is provided with a holding protrusion protruding toward the mounting target, and the holding protrusion is disposed in such a manner that a holding groove for holding the mounting target is formed between the back surface and the holding protrusion.

Preferably, the holding protrusion has a slope that allows the blow-molded body to rotate relative to the mounting target with the mounting target held in the holding groove.

Preferably, the mounting target includes a folded portion formed by folding a side edge of the mounting target in a direction in which the side edge moves away from the back surface, and the holding protrusion is disposed adjacent to the folded portion so as to suppress movement of the blow-molded body in left and right directions relative to the mounting target.

Preferably, the folded portion is disposed on both side edges of the mounting target, and the holding protrusion is disposed between the folded portion disposed on the both side edges.

Preferably, the holding protrusion is disposed adjacent to the folded portion so as to suppress the movement of the blow-molded body relative to the mounting target in one of the left and right directions, and the lower lock is disposed adjacent to a support bracket supporting the mounting target so as to suppress the movement of the blow-molded body relative to the mounting target in the other of the left and right directions.

Preferably, the blow-molded body further includes an upper lock disposed so as to protrude from the back surface to over the mounting target and configured to suppress downward movement of the blow-molded body relative to the mounting target.

BRIEF DESCRIPTION OF DRAWINGS

FIG. 4A is a right side view of the knee bolster 1 of the first embodiment, and FIG. 4B is a partial enlarged view of FIG. 4A.

FIGS. 6A, 6B, and 6C are drawings showing states before, while, and after the knee bolster 1 of the first embodiment is mounted on the mounting target.

FIG. 9A is a right side view of the knee bolster 1 of the second embodiment, and FIG. 9B is a partial enlarged view of FIG. 9A.

FIGS. 11A, 11B, and 11C are drawings showing states before, while, and after the knee bolster 1 of the second embodiment is mounted on the mounting target.

DETAILED DESCRIPTION

Now, embodiments of the present invention will be described. Various features described in the embodiments below can be combined with each other.
<Example of Mounting of Knee Bolster 1>

Figure 1:
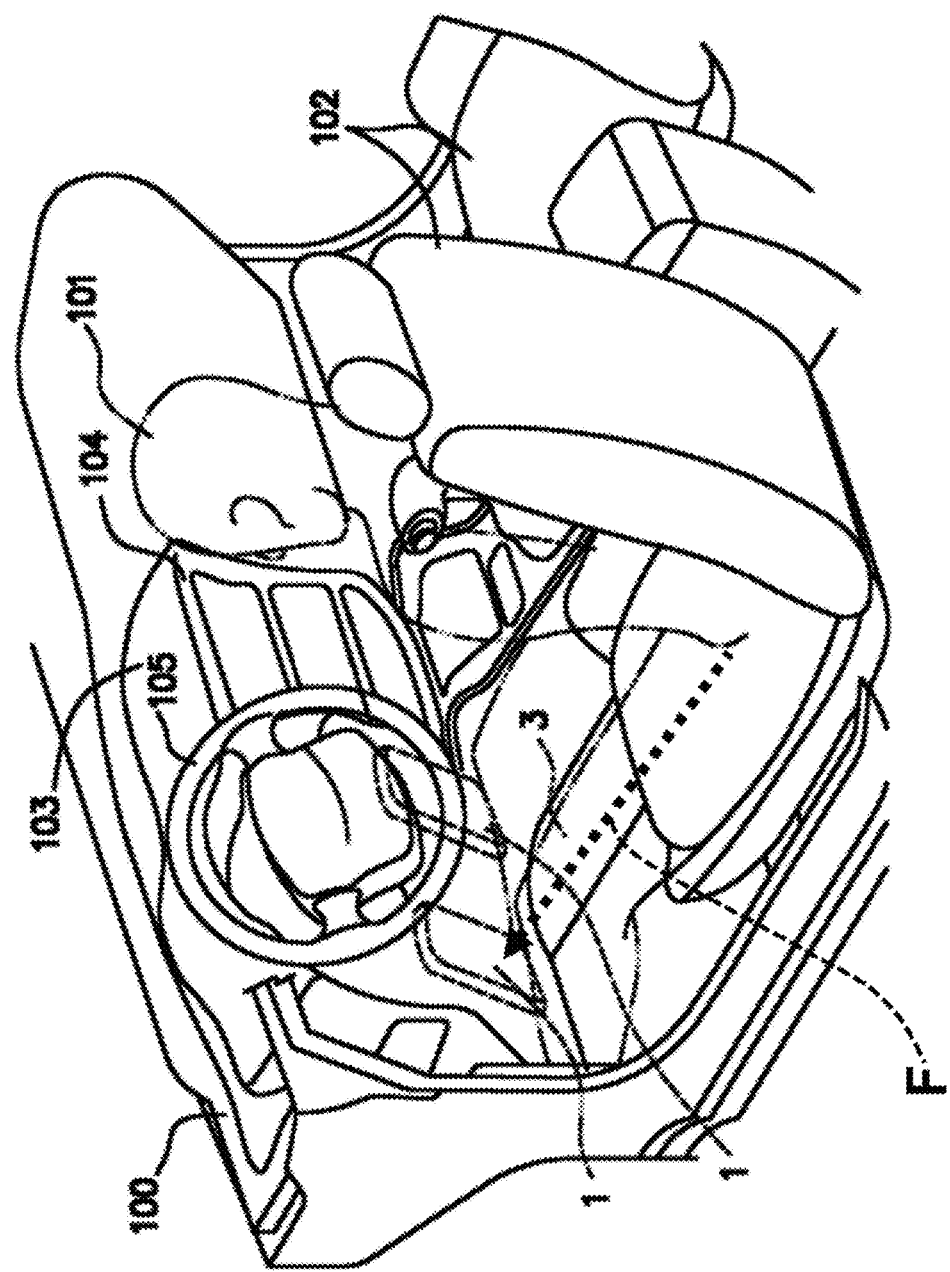
FIG. 1 is a drawing showing an example of mounting of a knee bolster of the present invention.

First, referring to FIG. 1, there will be described an example of mounting of knee bolsters 1 of a first embodiment. FIG. 1 shows a state in which the knee bolsters 1 (to be discussed later) is mounted on an automobile 100 as shock absorbers.

The vehicle 100 shown in FIG. 1 has a passenger cabin 103 containing front seats 102 for passengers including a driver 101. A meter 104 is located on a side of a handle 105. The knee bolsters 1 of the first embodiment are mounted on mounting targets that form the frame of the vehicle 100 and are located at the foot of the seats 102, so as to be adjacent to the knees 3 of the driver 101. Thus, when the automobile 100 receives a shock, the knees 3 contact the knee bolsters 1, which then reduce the shock to be applied to the knees 3 by absorbing the shock. While FIG. 1 shows the knee bolsters 1 on the driver's seat side, knee receiving members are also mounted on the passenger seat side, as with the driver's seat side, so as to be adjacent to the knees of a passenger on the passenger seat.
<Configuration of Knee Bolster 1>

1. First Embodiment

Referring to FIGS. 2 to 6, the knee bolster 1 of the first embodiment will be described. The knee bolster 1 is a blow-molded body 9 that becomes deformed when receiving a load F from a knee 3 of a passenger and thus absorbs a shock to be applied to the knee 3. The blow-molded body 9 is a hollow structure formed by blow molding.

Figure 2:
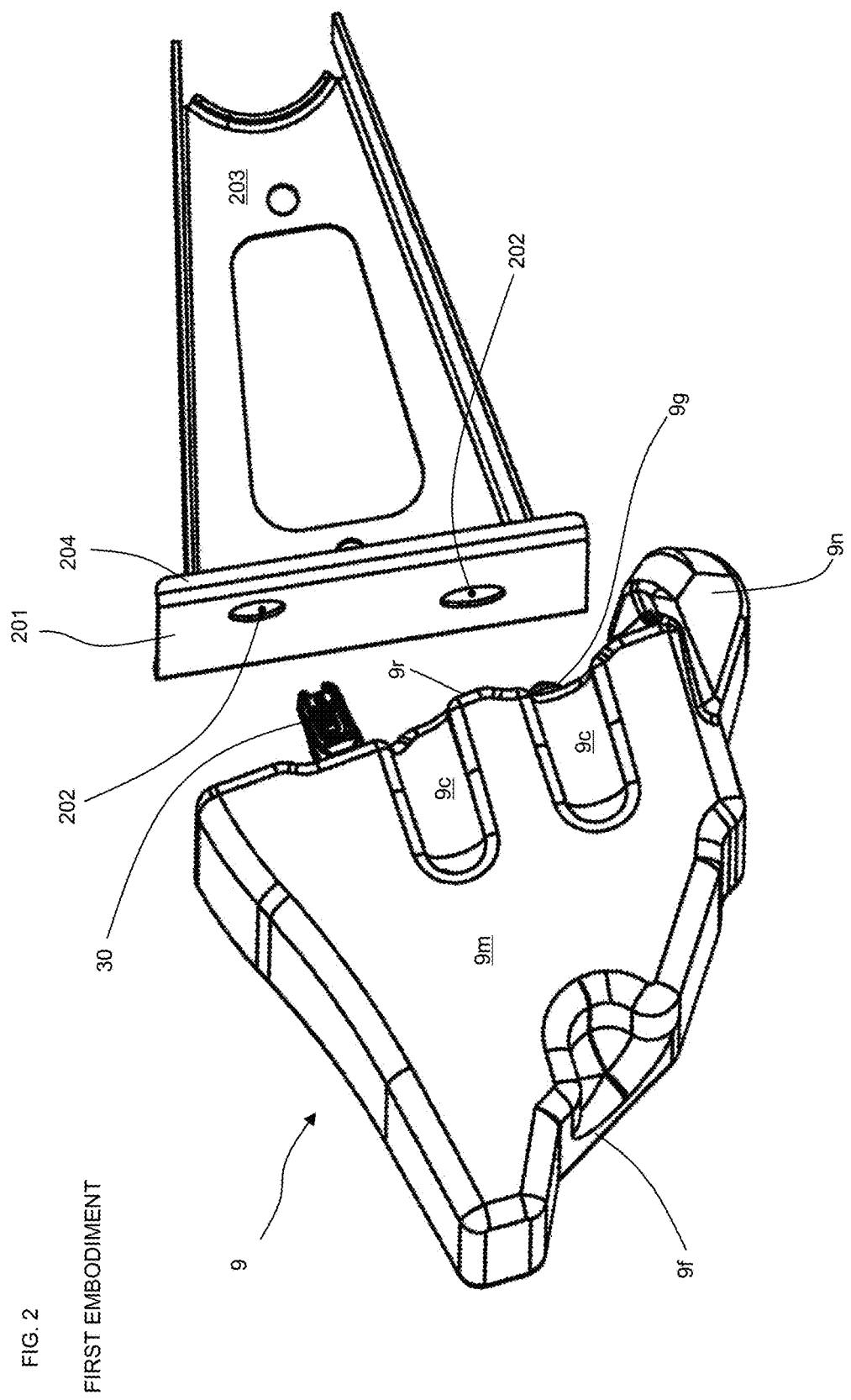
FIG. 2 is a drawing when a knee bolster 1 of a first embodiment is mounted on a mounting target.

FIG. 2 is a drawing when the knee bolster 1 of the first embodiment is mounted on mounting targets. In the first embodiment, a mounting plate 201 and a support bracket 203 supporting the mounting plate 201 serve as mounting targets. The blow-molded body 9 has a front surface 9f that is adjacent to the knee 3 and serves as the load input surface, a back surface 9r opposite to the front surface 9f, a right side surface 9m and a left side surface 9l (not shown) that connect the front surface 9f and back surface 9r, and a lower lock 9n that suppresses the upward movement of the blow-molded body 9 relative to the mounting plate 201. In the present specification, "upper," "lower," "right," "left," "front," and "back" refer to those seen from the passenger.

The back surface 9r has two mounting protrusions 9g to be inserted into mounting holes 202 of the mounting plate 201 (to be discussed later). When the mounting protrusions 9g are inserted into the mounting holes 202, the back surface 9r contacts the mounting plate 201. In the first embodiment, a clip 30 is mounted on the upper mounting protrusion 9g, and the mounting protrusion 9g inserted into the mounting hole 202 is firmly engaged with the mounting plate 201 by the elastic force of the clip 30. The lower lock 9n configured to suppress the upward movement of the blow-molded body 9 relative to the mounting plate 201 is disposed under the back surface 9r so as to protrude from the back surface 9r to under the mounting plate 201. The blow-molded body 9 may be designed as follows: the diameter of the clip 30 of the blow-molded body 9 is made larger than the diameter of the mounting hole 202 so that the back surface 9r does not contact the mounting plate 201. In this case, when the load F is inputted to the knee bolster 1, the clip 30 is pushed into the mounting hole 202, and the back surface 9r contacts the mounting plate 201.

The blow-molded body 9 has two transverse-groove ribs 9c on each of the right side surface 9m and left side surface 9l. The transverse-groove ribs 9c are recessed from the right side surface 9m and left side surface 9l toward the hollow and are disposed so as to be approximately parallel with the input direction of the load F. According to this configuration, the cross-sectional area seen from the input direction of the load F is increased in the regions where the ribs 9c are recessed. Thus, the capacity bearing the load F is increased.

Figure 3:
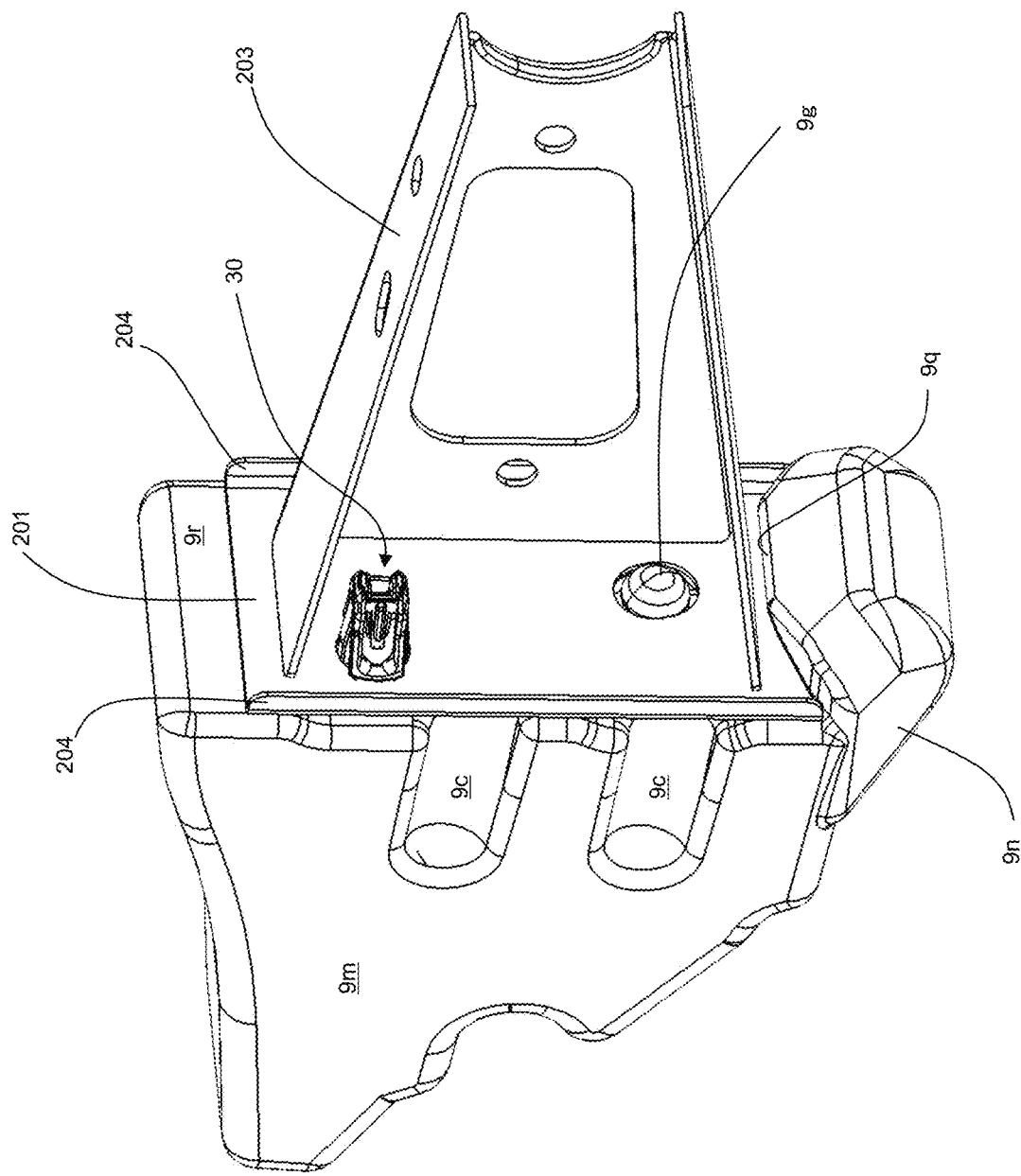
FIG. 3 is a rear perspective view showing a state in which the knee bolster 1 of the first embodiment is mounted on the mounting target.

FIG. 3 is a rear perspective view showing a state in which the knee bolster 1 of the first embodiment is mounted on the mounting target. With the blow-molded body 9 mounted on the mounting plate 201, the lower lock 9n protrudes from the back surface 9r to under the mounting plate 201. Thus, even if the load F is inputted to the blow-molded body 9 and the blow-molded body 9 moves upward, a holding groove 9p of the lower lock 9n and the mounting plate 201 hit each other, thereby suppressing the upward movement of the blow-molded body 9. Also, in the first embodiment, the left and right edges of the mounting plate 201 is provided with folded portions 204 formed by folding the mounting plate 201 in the direction in which the left and right edges of the mounting plate 201 moves away from the back surface 9r. Thus, even if the load F is inputted to the blow-molded body, which then moves horizontally, the horizontal movement of the blow-molded body 9 is suppressed in the region where the holding protrusion 9q and any folded portions 204 hit each other.

FIG. 4A is a right side view of the knee bolster 1 of the first embodiment, and FIG. 4B is a partial enlarged view of FIG. 4A. As shown in FIG. 4B, the lower lock 9n is provided with the holding protrusion 9q protruding toward the mounting plate 201, the holding groove 9p holding the mounting plate 201 between the back surface 9r and holding protrusion 9q, and a slope 9o that allows the blow-molded body 9 to rotate relative to the mounting plate 201 with the mounting plate 201 held in the holding groove 9p.

Figure 5:
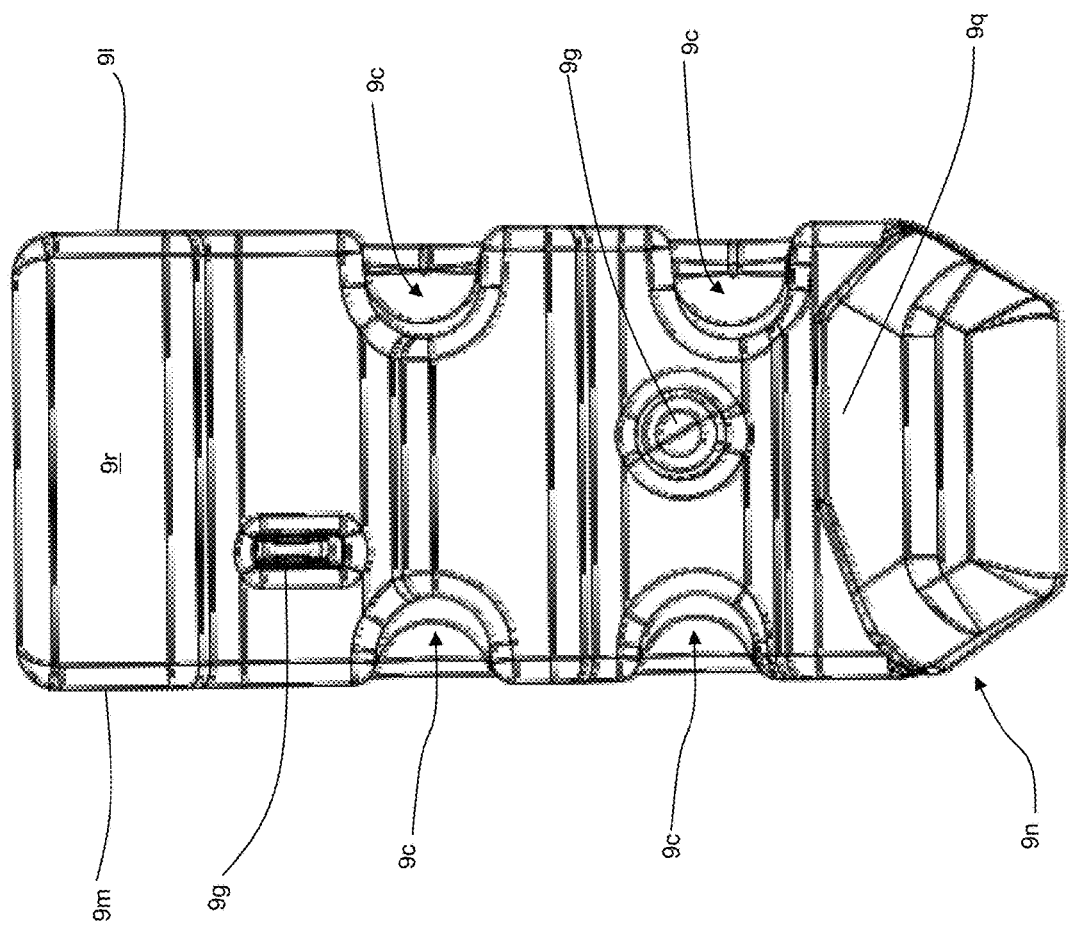
FIG. 5 is a back view of the knee bolster 1 of the first embodiment.

FIG. 5 is a back view of the knee bolster 1 of the first embodiment. In the first embodiment, the two mounting protrusions 9g are disposed so as to be displaced from each other in the left and right directions of the blow-molded body 9. The lower lock 9n is formed so as to extend over the left and right edges of the blow-molded body 9.

FIGS. 6A, 6B, and 6C are drawings showing states before, while, and after the knee bolster 1 of the first embodiment is mounted on the mounting target. First, in the state shown in FIG. 6A, the lower lock 9n is located under the mounting plate 201, and the holding groove 9p is pressed against the lower end of the mounting plate 201. Then, in the state shown in FIG. 6B, the blow-molded body 9 is rotated in the direction of an arrow X with the holding groove 9p pressed against the lower end of the mounting plate 201. Then, as shown in FIG. 6C, the mounting protrusions 9g are inserted into the mounting holes 202. As seen above, the positional relationship between the blow-molded body 9 and mounting plate 201 is determined by pressing the holding groove 9p against the lower end of the mounting plate 201 while hooking the holding protrusion 9q on the lower end of the mounting plate 201. Thus, by rotating the blow-molded body 9 thereafter, the mounting protrusions 9g can be easily inserted into the mounting holes 202. In the first embodiment, the holding protrusion 9q is designed such that upper portions thereof have shorter horizontal lengths. Thus, the holding protrusion 9q is easily inserted between the folded portion 204 in the state shown in FIG. 6A. Note that the lower lock 9n is designed so as to have a shape suitable for the mounting plate 201.

As seen above, unlike a conventional knee bolster, the knee bolster 1 of the first embodiment can be positioned with respect to the mounting target by pressing the holding groove 9p against the lower end of the mounting plate 201. Thus, the knee bolster 1 can be mounted easily compared to a conventional knee bolster.

2. Second Embodiment

Referring to FIGS. 7 to 12, a knee bolster 1 of a second embodiment will be described.

Figure 7:
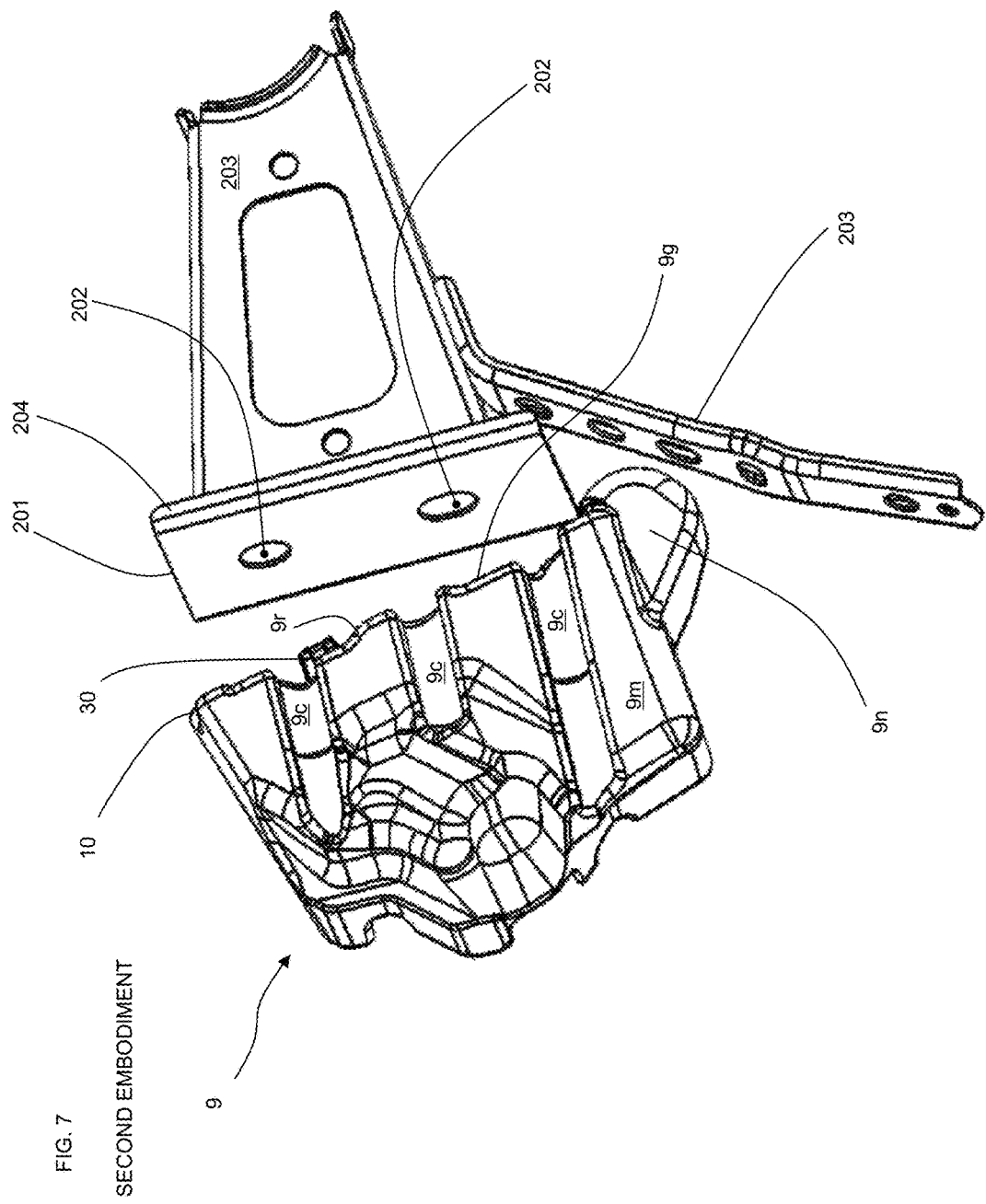
FIG. 7 is a drawing when a knee bolster 1 of a second embodiment is mounted on a mounting target.

FIG. 7 is a drawing when the knee bolster 1 of the second embodiment is mounted on a mounting target. A main difference between the second and first embodiments is that an upper lock 10 configured to suppress the downward movement of a blow-molded body 9 relative to a mounting plate 201 is disposed so as to protrude from a back surface 9r to over the mounting plate 201. Another difference is that a support bracket 203 supporting a mounting plate 201 also extends downward. In the second embodiment, a lower lock 9n contacts the support bracket 203. Yet another difference is that the knee bolster 1 of the second embodiment has a different shape and has three transverse-groove ribs 9c in each side surface. As in the first embodiment, in order to increase the capacity bearing a load F, the transverse-groove ribs 9c are formed so as to be approximately parallel with the input direction of the load F. While the lowest transverse-groove rib 9c is formed so as to extend over the entire length from a back surface 9r to a front surface 9f, the two upper and middle transverse-groove ribs 9c do not reach the front surface 9f although reaching the back surface 9r.

Figure 8:
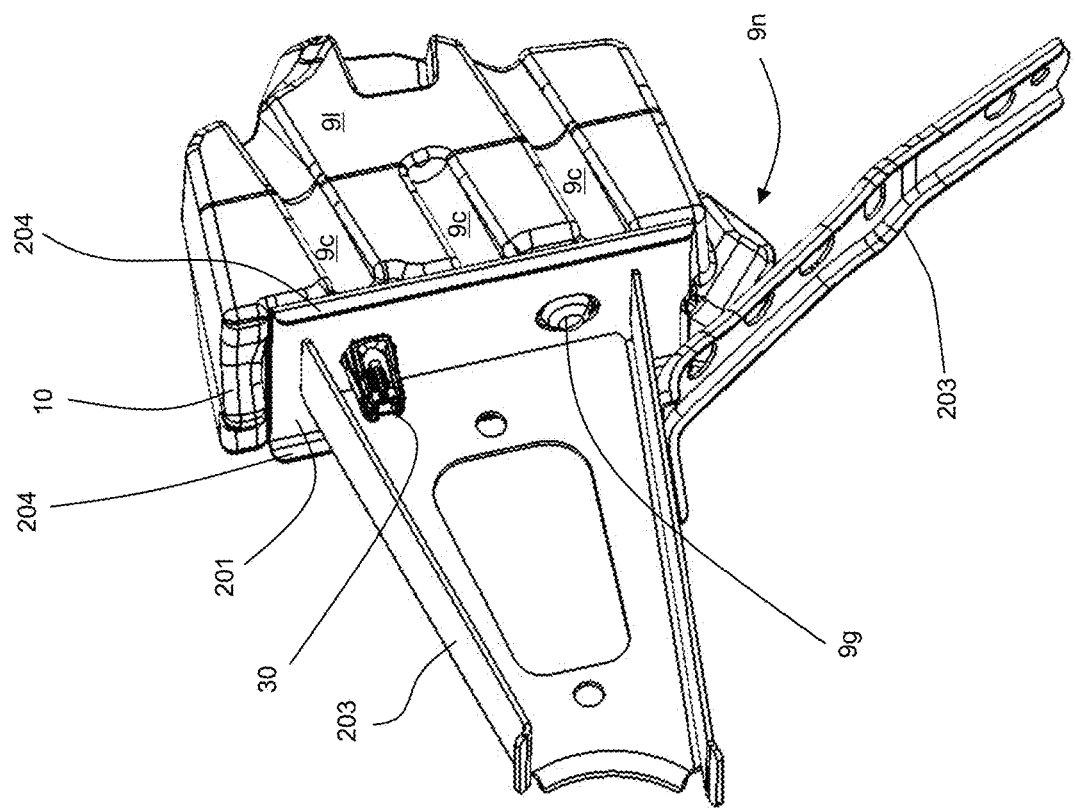
FIG. 8 is a rear perspective view showing a state in which the knee bolster 1 of the second embodiment is mounted on the mounting target.

FIG. 8 is a rear perspective view showing a state in which the knee bolster 1 of the second embodiment is mounted on the mounting target. As in the first embodiment, a clip 30 is mounted on an upper mounting protrusion 9g.

FIG. 9A is a right side view of the knee bolster 1 of the second embodiment, and FIG. 9B is a partial enlarged view of FIG. 9A. In the knee bolster 1 of the second embodiment, a holding protrusion 9q is disposed adjacent to a folded portion 204 so as to suppress the movement of the knee bolster 1 relative to the mounting target in one of the left and right directions. Also, the lower lock 9n is disposed adjacent to the support bracket 203 so as to suppress the movement of the knee bolster 1 relative to the mounting target in the other of the left and right directions. These characteristics will be described later with reference to FIG. 12.

Figure 10:
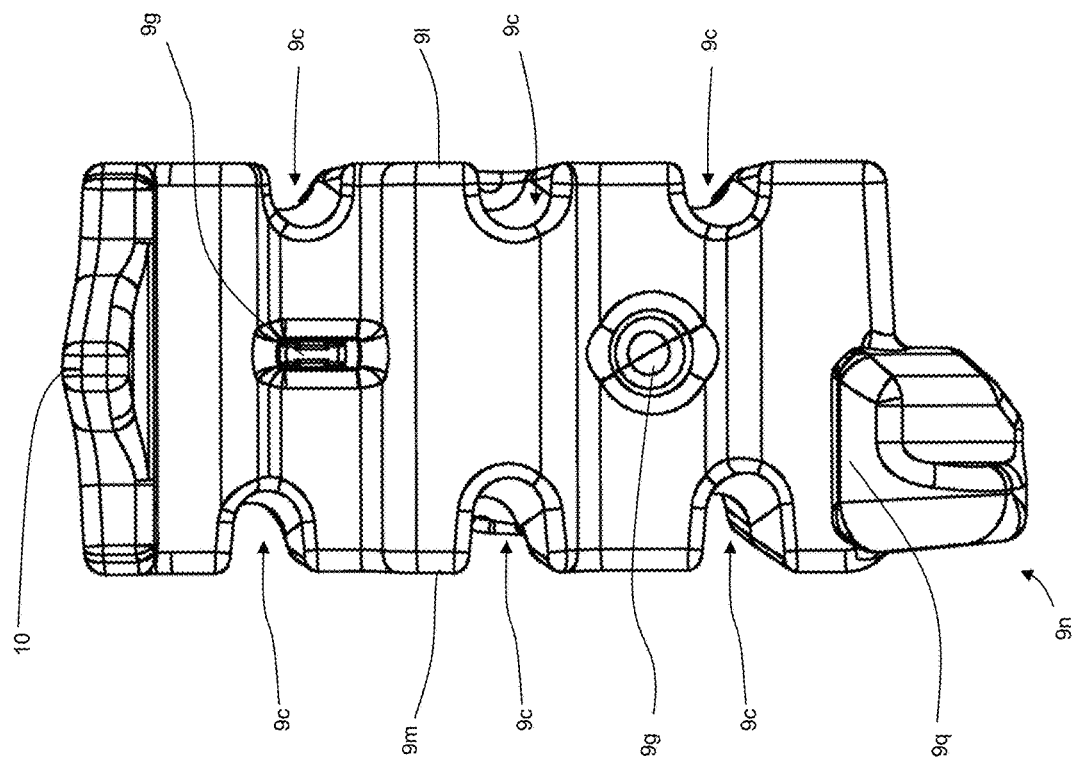
FIG. 10 is a back view of the knee bolster 1 of the second embodiment.

FIG. 10 is a back view of the knee bolster 1 of the second embodiment. In the second embodiment, two mounting protrusions 9g are disposed along the vertical direction of the blow-molded body 9. The lower lock 9n is disposed close to a right side surface 9m.

FIGS. 11A, 11B, and 11C are drawings showing states before, while, and after the knee bolster 1 of the second embodiment is mounted on the mounting target. First, in the state shown in FIG. 11A, the lower lock 9n is located under the mounting plate 201, and a holding groove 9p is pressed against the lower end of the mounting plate 201. Also, the lower lock 9n is pressed against the lower portion of the support bracket 203. Then, in the state shown in FIG. 11B, the blow-molded body 9 is rotated in the direction of an arrow X with the holding groove 9p pressed against the lower end of the mounting plate 201. Then, as shown in FIG. 11C, the mounting protrusions 9g are inserted into mounting holes 202. As seen above, the positional relationship between the blow-molded body 9 and mounting plate 201 is determined by pressing the holding groove 9p against the lower end of the mounting plate 201 while hooking the holding protrusion 9q on the lower end of the mounting plate 201. Thus, when the blow-molded body 9 is rotated thereafter, the mounting protrusions 9g can be easily inserted into the mounting holes 202. Also, in the second embodiment, the upper lock 10 configured to suppress the downward movement of the blow-molded body 9 relative to the mounting plate 201 is disposed so as to protrude from the back surface 9r to over the mounting plate 201. Thus, when the load F is applied to the blow-molded body 9, the blow-molded body 9 can be made more stable. The lower lock 9n is designed so as to have a shape suitable for the mounting plate 201.

Figure 12:
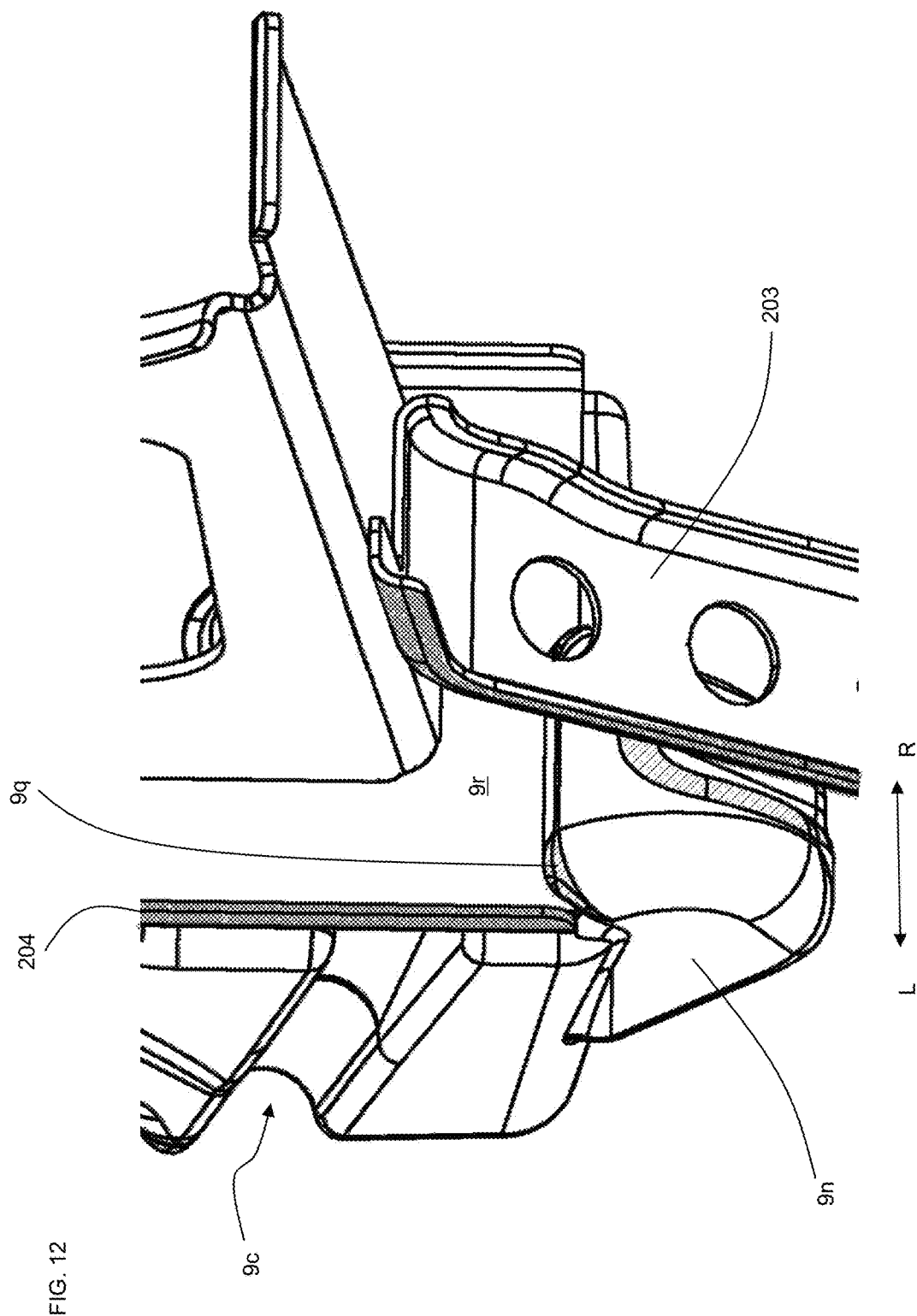
FIG. 12 is a rear partial enlarged view showing a state in which the knee bolster 1 of the second embodiment is mounted on the mounting target.

FIG. 12 is a rear partial enlarged view showing a state in which the knee bolster 1 of the second embodiment is mounted on the mounting target. While, in the first embodiment, the holding protrusion 9q is disposed between the folded portions 204 on both edges of the mounting plate 201, a different configuration is used in the second embodiment. In the second embodiment, the holding protrusion 9q is disposed adjacent to the folded portion 204 so as to suppress the movement of the blow-molded body 9 relative to the mounting plate 201 in one of the left and right directions. Also, the lower lock 9n is disposed adjacent to the support bracket 203 supporting the mounting plate 201 so as to suppress the movement of the blow-molded body 9 relative to the mounting plate 201 in the other of the left and right directions. Specifically, when the load F is inputted to the blow-molded body 9, which then moves in the direction of an arrow L in FIG. 12, the movement of the blow-molded body 9 in the left and right directions is suppressed in the region where a dotted portion of the folded portion 204 and a hatched portion of the holding protrusion 9q hit each other. Also, when the load F is inputted to the blow-molded body 9, which then moves in the direction of an arrow R in FIG. 12, the movement of the blow-molded body 9 in the left and right directions is suppressed in the region where a dotted portion of the support bracket 203 and a hatched portion of the lower lock 9n hit each other. Also, in mounting the blow-molded body 9, the holding protrusion 9q and lower lock 9n are located adjacent to the folded portion 204 and support bracket 203, respectively, and the holding groove 9p is pressed against the lower end of the mounting plate 201. Thus, the blow-molded body 9 is easily positioned.

As seen above, in the knee bolster 1 of the second embodiment, the blow-molded body 9 can be positioned by pressing the holding groove 9p against the lower end of the mounting plate 201, and the mounting protrusions 9g can be easily inserted into the mounting holes 202 by rotating the blow-molded body 9. Also, the downward movement of the blow-molded body 9 relative to the mounting plate 201 can be suppressed by the upper lock 10.

DESCRIPTION OF REFERENCE SIGNS

1: knee bolster, 3: knee, 9: blow-molded body, 9c: transverse-groove rib, 9f: front surface, 9g: mounting protrusion, 9l: left side surface, 9m: right side surface, 9n: lower lock, 9o: slope, 9p: holding groove, 9q: holding protrusion, 9r: back surface, 10: upper lock, 20: mounting target, 201: mounting plate, 202: mounting hole, 203: support bracket, 30: clip

The invention claimed is:

1. A knee bolster formed of a blow-molded body, wherein the blow-molded body has a back surface having a mounting protrusion to be inserted into a mounting hole formed in a mounting target,
   the blow-molded body comprises a lower lock disposed so as to protrude from the back surface to under the mounting target and configured to suppress upward movement of the blow-molded body relative to the mounting target, and
   the lower lock is configured to engage with the mounting target so that the blow-molded body moves rotationally around a lower locking portion to approach the mounting target, the lower lock is provided at a lower end of the back surface and the lower lock is hollow.

2. The knee bolster of claim 1, wherein
   the lower lock is provided with a holding protrusion protruding toward the mounting target, wherein
   the holding protrusion is disposed in such a manner that a holding groove for holding the mounting target is formed between the back surface and the holding protrusion.

3. The knee bolster of claim 2, wherein
   the holding protrusion has a slope that allows the blow-molded body to rotate relative to the mounting target with the mounting target held in the holding groove.

4. The knee bolster of claim 1, wherein
   the blow-molded body further comprises an upper lock disposed so as to protrude from the back surface to over the mounting target and configured to suppress downward movement of the blow-molded body relative to the mounting target.

5. The knee bolster of claim 1, wherein
   the mounting protrusion is provided between the lower end and a second end on an upper end of the back surface.

6. The knee bolster of claim 1, wherein
   an upper end of the back surface has no lock.

7. A knee bolster formed of a blow-molded body, wherein the blow-molded body has a back surface having a mounting protrusion to be inserted into a mounting hole formed in a mounting target,
   the blow-molded body comprises a lower lock disposed so as to protrude from the back surface to under the mounting target and configured to suppress upward movement of the blow-molded body relative to the mounting target,
   the lower lock is provided with a holding protrusion protruding toward the mounting target,
   the mounting target includes a folded portion formed by folding a side edge of the mounting target in a direction in which the side edge moves away from the back surface, wherein
   the holding protrusion is disposed adjacent to the folded portion so as to suppress movement of the blow-molded body in one of left and right directions relative to the mounting target.

8. The knee bolster of claim 7, wherein
   the folding portion is disposed on both side edges of the mounting target, wherein
   the holding protrusion is disposed between the folded portion disposed on the both side edges.

9. The knee bolster of claim 7, wherein
   the holding protrusion is disposed adjacent to the folded portion so as to suppress the movement of the blow-molded body relative to the mounting target in one of the left and right directions, wherein
   the lower lock is disposed adjacent to a support bracket supporting the mounting target so as to suppress the movement of the blow-molded body relative to the mounting target in the other of the left and right directions.

* * * * *